United States Patent
Yuan et al.

(10) Patent No.: US 10,410,256 B2
(45) Date of Patent: Sep. 10, 2019

(54) SYSTEM, METHOD, AND NON-TRANSITORY COMPUTER-READABLE STORAGE MEDIA FOR ASSIGNING OFFERS TO A PLURALITY OF TARGET CUSTOMERS

(71) Applicant: Wal-Mart Stores, Inc., Bentonville, AR (US)

(72) Inventors: Mindi Yuan, San Bruno, CA (US); Wei Shen, Danville, CA (US); Yannis Pavlidis, Boulder, CO (US); Jun Li, Burlingame, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 716 days.

(21) Appl. No.: 14/632,788

(22) Filed: Feb. 26, 2015

(65) Prior Publication Data
US 2016/0253714 A1 Sep. 1, 2016

(51) Int. Cl.
*G06Q 30/06* (2012.01)
*G06Q 30/02* (2012.01)

(52) U.S. Cl.
CPC ..... *G06Q 30/0275* (2013.01); *G06Q 30/0251* (2013.01); *G06Q 30/0625* (2013.01); *G06Q 30/0631* (2013.01); *G06Q 30/0633* (2013.01); *G06Q 30/0643* (2013.01); *G06Q 30/0255* (2013.01)

(58) Field of Classification Search
CPC .......... G06Q 30/0275; G06Q 30/0251; G06Q 30/0631; G06Q 30/06343; G06Q 30/0633; G06Q 30/0625; G06Q 30/0255
See application file for complete search history.

(56) References Cited

U.S. PATENT DOCUMENTS

| | | | | |
|---|---|---|---|---|
| 6,336,099 B1* | 1/2002 | Barnett | ................ | G06Q 20/108 705/14.35 |
| 8,175,950 B1* | 5/2012 | Grebeck | ............ | G06Q 30/0201 463/42 |
| 2002/0107729 A1* | 8/2002 | Katz | ..................... | G06Q 30/02 705/14.53 |
| 2012/0041866 A1* | 2/2012 | Glodjo | .................. | G06Q 20/10 705/37 |
| 2015/0154631 A1* | 6/2015 | Umeda | ............. | G06O 30/0243 705/14.42 |
| 2015/0262221 A1* | 9/2015 | Nakano | ............. | G06O 30/0246 705/14.45 |
| 2015/0332310 A1* | 11/2015 | Cui | .................... | G06O 30/0244 705/14.45 |

(Continued)

OTHER PUBLICATIONS

Yuan et al., "Auction/Belief propagation algorithms for constrained assignment problem"; pp. 1-12; Walmart Labs and University of Illinois at Urbana-Champaign.

*Primary Examiner* — Raquel Alvarez
(74) *Attorney, Agent, or Firm* — Bryan Cave Leighton Paisner LLP

(57) ABSTRACT

Techniques for generating offers to a plurality of target customers are disclosed. Each offer has an associated score value for each target customer. The techniques, including an iterative process, assign to the target customers based on the score value assigned to, and a current value to, the respective target customer. The assigned offers may then be generated and delivered to the respective target customers.

21 Claims, 4 Drawing Sheets

(56) References Cited

U.S. PATENT DOCUMENTS

| | | | |
|---|---|---|---|
| 2015/0332317 A1* | 11/2015 | Cui | G06O 30/0247 |
| | | | 705/14.46 |
| 2016/0026499 A1* | 1/2016 | Boosman | G06F 17/30522 |
| | | | 718/104 |
| 2016/0086215 A1* | 3/2016 | Wang | G06Q 30/0246 |
| | | | 705/14.45 |
| 2016/0092933 A1* | 3/2016 | Xu | G06O 30/0275 |
| | | | 705/14.71 |
| 2016/0379277 A1* | 12/2016 | Karlsson | G06Q 30/0275 |
| | | | 705/14.45 |
| 2017/0213253 A1* | 7/2017 | Golder | G06Q 30/0269 |

\* cited by examiner

SYSTEM, METHOD, AND NON-TRANSITORY COMPUTER-READABLE STORAGE MEDIA FOR ASSIGNING OFFERS TO A PLURALITY OF TARGET CUSTOMERS

FIELD OF THE DISCLOSURE

The present invention relates to the development of customers of a retail (online and/or brick and mortar) store, and more particularly, to systems, methods, and computer-readable storage media that may be used to generate offers to a plurality of target customers of the retail store.

BACKGROUND

Many retail stores, whether online and/or brick and mortar, participate in large and expensive marketing plans in order to develop, to grow, and to maintain a customer base. Part of the marketing plan may include an advertising plan that may include offers to new and/or existing customers.

The offers may include coupons (for example, a coupon for a discount), rebates, product recommendations, indication of a price drop, and the like. The offers may be time sensitive, e.g., valid for a limited time or during a predetermined time period. The offers may be associated with goods or services that are limited in nature. For example, an offer may be associated for a product that the retail store only has in its possession a limited quantity. Or, the retail store may only be financially able to provide the goods or services under the offer on a limited basis.

Furthermore, it may be cost prohibitive to provide the offers to a large number (or all) of a set of customers. One downside to providing the offer to a large number of customers is that such a widespread offer may be expensive to provide. Also, the likelihood of a large number of the customers that utilize the offer may be quite small.

The present invention is aimed at one or more of the problems identified above.

SUMMARY OF THE INVENTION

In different embodiments of the present invention, systems, methods, and computer-readable storage media allow orders to be made remotely by customers and to populate a virtual basket with a preset list of goods as a function of reference time data and time data associated with the preset list of goods to be received.

In one embodiment, a system comprising a memory unit, a current cost unit, and a bid establishing unit is provided. The memory unit is configured to store data associated with a plurality of potential offers. The memory unit is also configured to store a score value for each one of the plurality of potential offers for each one of a plurality of target customers. The current cost unit is coupled to the memory unit and is configured to assign a current cost to each one of the potential offers. The bid establishing unit is coupled to the memory unit and configured to perform the following steps for each one of the plurality of target customers in turn: (a) assign a current value for each one of the potential offers to the respective one of the plurality of target customers as a function of the respective score value and the current cost of the potential offers, (b) establishing a potential bid for one of the potential offers as a function of the current value of each potential offer, and (c) assigning the potential bid of one of the plurality of target customers to the one of the potential offers if the potential bid is greater than a previous bid for the one of the potential offers. The current cost unit is further configured to update the current cost of the potential offers as bids are assigned. The bid for one or more of the potential offers by one of the target customers may replace the bid for the one or more of the potential offers made by another one of the target customers. The bid establishing unit is further configured to iteratively perform (a), (b), and (c) until an aggregate value for all target customers is maximized. The bid establishing unit is further configured to store data related to the assignment of the offers to the target customers in the memory unit.

In another embodiment a method is provided. The method includes the steps of storing, in a memory unit, data associated with a plurality of potential offers and a score value for each one of the plurality of potential offers for each one of a plurality of target customers. The method further includes the step of assigning, using a current cost unit, a current cost to each one of the potential offers. For each one of the plurality of target customers the following steps are performed: (a) assigning a current value for each one of the potential offers to the respective one of the plurality of target customers as a function of the respective score value and the current cost of the potential offers, (b) establishing a potential bid for one of the potential offers as a function of the current value of each potential offer, and (c) assigning the bid of one of the plurality of target customers to the one of the potential offers if the potential bid is greater than a previous bid for the one of the potential offers. Steps (a), (b), and (c) are performed iteratively until an aggregate value for all target customers is maximized. The method may further include the steps of updating the current cost of the potential offers as bids are assigned, replacing the bid for one or more of the potential offers by one of the target customers with the bid for the one or more of the potential offers made by another one of the target customers, and storing data related to the assignment of the offers to the target customers in the memory unit.

In still another embodiment, one or more non-transitory computer-readable storage media, having computer-executable instructions embodied thereon are provided. When executed by at least one processor, the computer-executable instructions cause the processor to allow a customer operate as a memory unit, a current cost unit, and a bid establishing unit is provided. The memory unit is configured to store data associated with a plurality of potential offers. The memory unit is also configured to store a score value for each one of the plurality of potential offers for each one of a plurality of target customers. The current cost unit is coupled to the memory unit and is configured to assign a current cost to each one of the potential offers. The bid establishing unit is coupled to the memory unit and configured to perform the following steps for each one of the plurality of target customers in turn: (a) assign a current value for each one of the potential offers to the respective one of the plurality of target customers as a function of the respective score value and the current cost of the potential offers, (b) establishing a potential bid for one of the potential offers as a function of the current value of each potential offer, and (c) assigning the bid of one of the plurality of target customers to the one of the potential offers if the potential bid is greater than a previous bid for the one of the potential offers. The current cost unit is further configured to update the current cost of the potential offers as bids are assigned. The bid for one or more of the potential offers by one of the target customers may replace the bid for the one or more of the potential offers made by another one of the target customers. The bid establishing unit is further configured to iteratively perform (a), (b), and (c) until an aggregate value for all target customers is maximized. The bid establishing unit is further configured to store data related to the assignment of the offers to the target customers in the memory unit.

BRIEF DESCRIPTION OF THE FIGURES

Other advantages of the present disclosure will be readily appreciated, as the same becomes better understood by reference to the following detailed description when considered in connection with the accompanying drawings wherein.

Non-limiting and non-exhaustive embodiments of the present invention are described with reference to the following figures, wherein like reference numerals refer to like parts throughout the various views unless otherwise specified.

Figure 1:
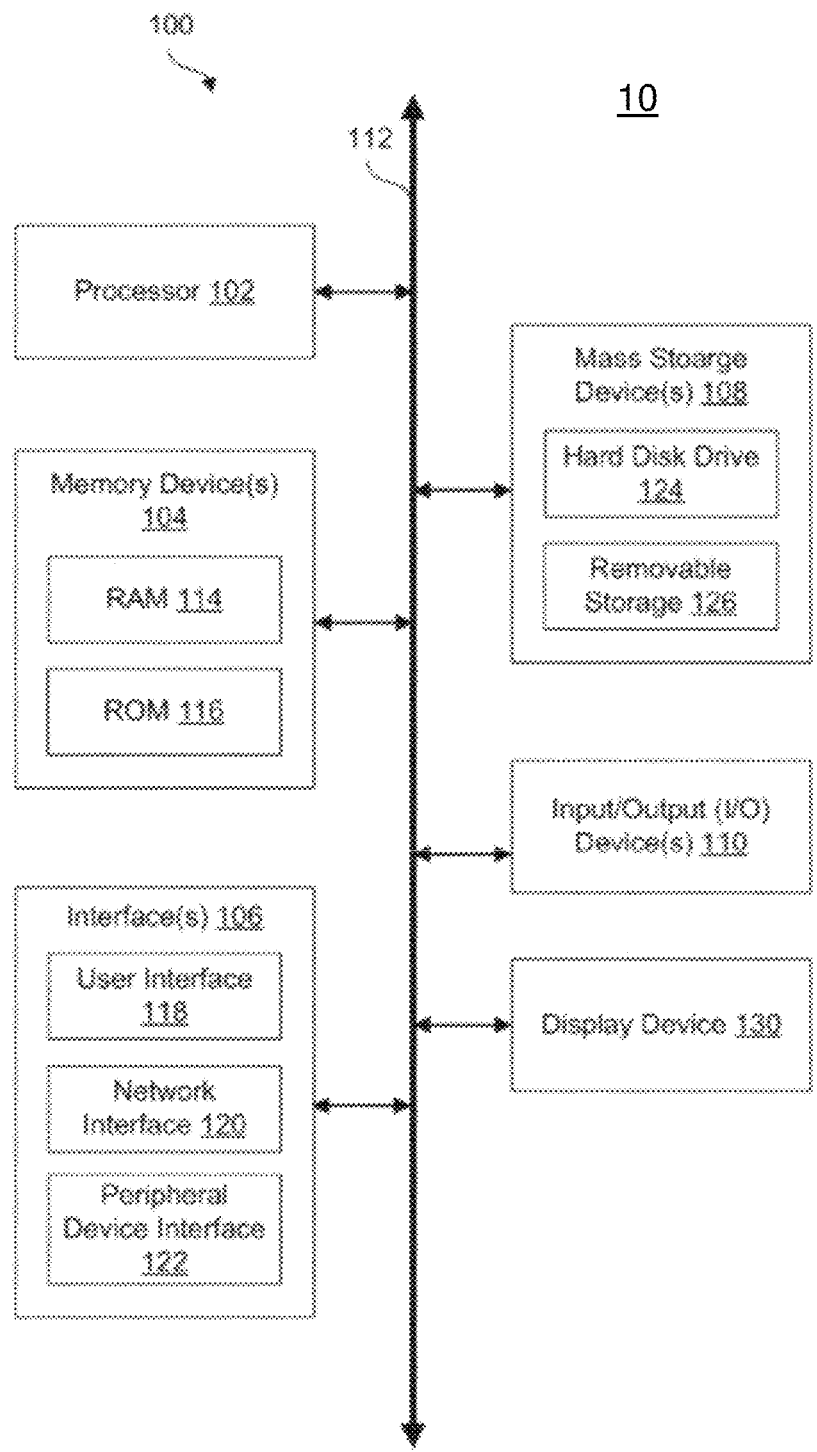
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The disclosure particularly describes offers may be generated and delivered to target customers. The availability of offers may be limited. Particularly, the present disclosure describes how a system associated with a retail store assigns offers to target customers based on the likelihood that a customer will exercise the offer that maximizes the effectiveness of the limited offers.

With reference to the FIGS. and in operation, the present invention provides a system 10, methods and computer product media that generates offers to a plurality of target customers. With reference to the FIGS. and in operation, the present invention provides a system 10, methods and computer product media that has stored thereon a computer program, that generates offers. The generated offers may be in the form of coupons (for example, a coupon for a discount), rebates, product recommendations, indication of a price drop, and the like. The offers may be delivered to the customer in the form of an electronic communication, such as an email message, a direct (paper) mailing, or an electronic message or record assigned to a customer account. Transactions could be tracked, e.g., through a customer loyalty card associated with a customer loyalty program. Offers may be assigned to, and accessed through the customer loyalty program. The system 10 that implements the present invention may be incorporated into, and accessed through a larger system that enables online ordering of goods or services. The ordered goods or services may be ordered for delivery at a customer chosen location or ordered for pickup of a designated location, e.g., a retail store. Redemption of offers, e.g., coupons, rebates, etc. . . . , by the customers may be tracked through either online order or redemption of the offers at the store through the customer loyalty program. Redemption of the offers, whether made through the present invention or through another avenue, as well as the customers transaction history may be used to establish a likelihood that a particular customer may utilize or exercise a given offer. As discussed in depth more fully below, this likelihood may be used to establish a score value and stored in the system 10 (see below) to assign and generate offers to target customers.

FIG. 1 is a block diagram illustrating an example computing device 100. Computing device 100 may be used to perform various procedures, such as those discussed herein. Computing device 100 can function as a server, a client, or any other computing entity. Computing device 100 can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
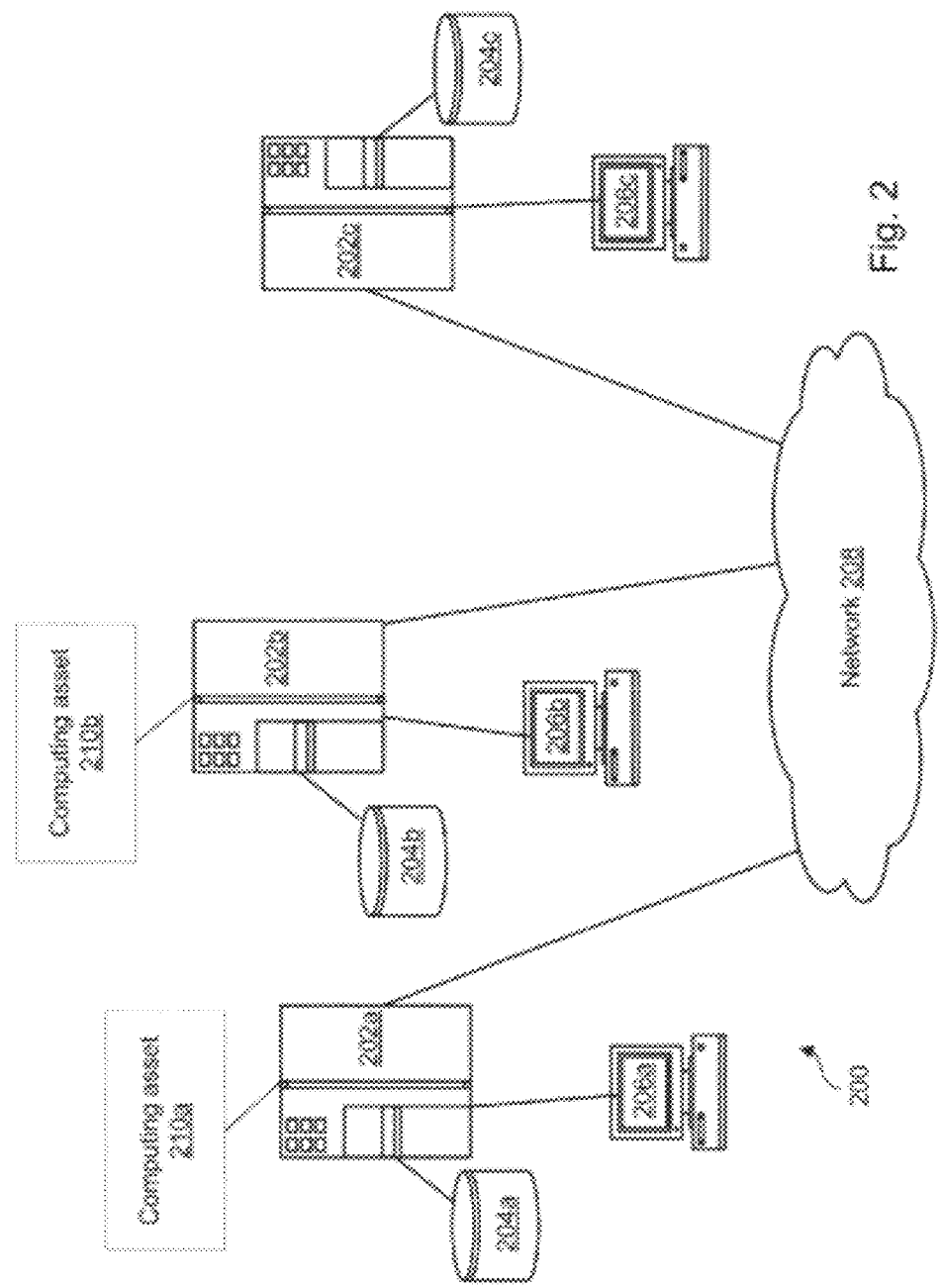
FIG. 2 is a schematic illustrating example components of computer network, according to an embodiment of the present invention.

Referring to FIG. 2, an exemplary environment in which the system 10 operates is illustrated. In general, the offers may be redeemed, accepted, or executed either online or at a retail store. If the offer is for associated goods, the customer may order the goods online and have the goods delivered or pick up the goods at a specified location, such as a store 20. The store 20 may be representative of a larger corporate environment which may provide many avenues of interface with a customer. In a modern shopping environment, a store 20 may include both one or more brick and mortar retail locations and an on line retail location.

FIG. 2 illustrates a networked environment 200 in which methods described herein may be used. The environment 200 may include a plurality of computer servers 202a-202c. The servers 202a-202c may be geographically separated, such as in different cities, countries, or continents. The methods disclosed herein may also advantageously be used with computer servers 202a-202c that are located within the same facility. The computer servers 202a-202c may be operably coupled to one or more databases 204a-204c for storing operational and/or executable data. A user wishing to access data and functionality of the computer servers 202a-202c and databases 204a-204c may do so by means of terminals 206a-206c operably coupled thereto. The computer servers 202a-202c and/or terminals 206a-206c may have some or all of the attributes of the computing device 100 of FIG. 1. The terminals 206a-206c may be a /workstation, tablet computer, smart phone, or any other computing device. The servers 202a-202c may be operably connected to one another by a network 208. The network 208 may include a local area network (LAN), wide area network (WAN), the Internet, or a combination of any of these.

The servers 202a-202b may be used to manage and/or monitor activity at one or more computing assets 210a-210b. The computing assets 210a-210b may include a number of servers, workstations, tablet computers, smart phones, and the like. The computing assets 210a-210b may also include electronically controlled physical systems, i.e., door locks, climate control systems, alarm systems, and the like. The physical systems of the computing assets 210a-210b may also be controlled and/or monitored by a server, such as a server 202a-202c.

A server 202c may operate as a global server 202c operable to monitor and report on security data gathered from the servers 202a-202b, operating as asset server 202a-202b, and the corresponding computing assets 210a-210b. Alternatively, the global server 202c may communicate directly with computing resources of the computing assets 210a-210b such that asset servers 202a-202b may be omitted or bypassed.

Figure 3:
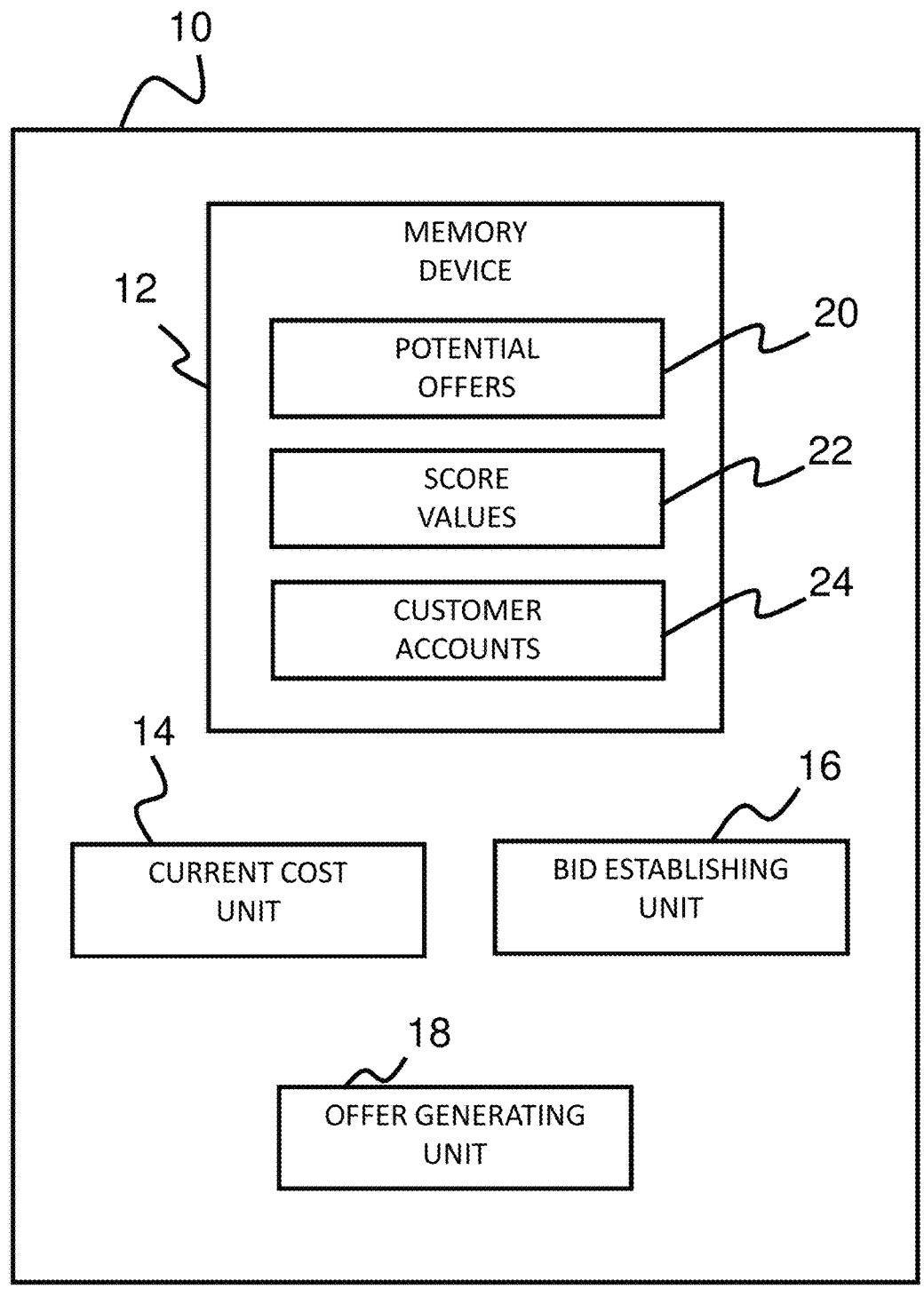
FIG. 3 is a functional schematic of the present invention, according to an embodiment of the present invention; and, FIG. 4 is a flowchart of a method that may be used with the system shown in FIG. 1, according to an embodiment of the present invention.

With reference to FIG. 3, the system 10 includes a memory device 12, a current cost unit 14, a bid establishing unit 16, and offer generating unit 18. In general, the system 10 performs an iterative process that allows the target customers to virtually "bid" on offers. The target customers, via the present invention, take turns to bid on their favorite or most favorable or desirable offers as determined by the score values. After each "bid" a cost or price associated with the offer(s) are updated or established based on the bid. As the process continues, the target customers adjust their bids based on the current costs/prices and the value of the offer to the customer. As discussed more fully below, the process is terminated once an aggregated value of the offers assigned to all of the target customers is maximized.

In one embodiment, the memory device 12 may be configured to store data associated with a plurality of potential offers 20. The offers may include coupons (for example, a coupon for a discount), rebates, product recommendations, indication of a price drop, and the like. The offers may be time sensitive, e.g., valid for a limited time or during a predetermined time period. The offers may be associated with goods or services that are limited in nature. For example, an offer may be associated for a product that the retail store only has in its possession a limited quantity. Or, the retail store may only be financially able to provide the goods or services under the offer on a limited basis.

The memory device may also being configured to store a score value for each one of the plurality of potential offers for each one of a plurality of target customers 22. In one aspect of the present invention, the score value represents the likelihood that the target customer 22 may use, execute, or otherwise utilize the respective potential offer. The likelihood may be based, at least in part, on the transaction data stored in the system 10. The transaction data may include not only previous purchases made by the targeted customers, but also data associated with the utilization of past offers by the targeted customers. In one embodiment of the invention, the score values are normalized, i.e., $0 \leq \text{score value} \leq 1$.

The current cost unit 14 is coupled to the memory device 12 and IS configured to assign a current cost to each one of the potential offers. In one embodiment, initially, the current cost of each potential offers is set to zero. In one embodiment of the present invention, if there is only one copy of a potential offer available (see below), then the current cost of each potential offer is set to the current bid (or bid price). If there are multiple copies of a potential offer available (see below), the current price is set to the lowest value or bid price of all bids for the respective offer. If there are any unassigned copies, then the cost is set to zero.

The bid establishing unit 16 is coupled to the memory device 12 and configured to perform an iterative process to maximize the overall or aggregate value of the generated/ assigned offers made to the target customers. In general, until terminated the following process is performed for each target customer.

First, a current value is assigned to each potential offer. In one embodiment, the current value is a function of the score value associated with each potential offer, the price/cost of the potential offer, and the loss to the customer if offer is assigned to the customer.

For example, the current value of a particular potential offer to a target customer may be set to:

score value—price cost of the offer—loss to the target customer.

In one embodiment, the loss to the target customer is set equal to the score value of the next desirable potential offer to the target customer (see below).

After the current value of a potential bid has been established, a potential bid is established. In one embodiment, the potential bid has a bid price that is set to the current value of the potential offer (to the respective target customer) plus the cost/price of the potential offer.

Finally, the target customer's bid is assigned to the potential offer if the potential bid is greater than a previous bid for the one of the potential offers.

It should be noted that the above process is performed for each target customer in turn. However for each customer in one embodiment, the potential offers have the highest score value are deemed most valuable and evaluated first.

In one aspect of the present invention, the current cost unit is further configured to update the current cost of the potential offers as bids are assigned. The bid for one or more of the potential offers by one of the target customers may replace the bid for the one or more of the potential offers made by another one of the target customers (if the new potential bid is greater than the previous bid).

In some embodiment, each target customer has an associated maximum number of offers that may be assigned thereto. The maximum number of offers for each target customer may be different. In one embodiment, for each turn of the above process a new offer may be assigned to the target customer (up until the target customer's maximum number of offers). It should be noted that a target customer may be assigned a number of offers less than the maximum number of offers.

In another embodiment, each target customer may have a range of offers. The target customer must be assigned a number of offers greater than or equal to a minimum number of offers and assigned a number of offers less than or equal to the maximum number of offers.

Additionally, each potential offer may have an assigned number of copies. Each offer may be made the respective assigned number of copies.

In another embodiment of the present invention, the potential offers may organized by categories. Each category may contain one or more potential offers. Each customer may be assigned only a predetermined number of offers from each category, e.g., one. The number of offers that may be assigned may vary by category and/or target customer.

As discussed previously, the above process is iteratively performed an aggregate value for all target customers is maximized. In other words, based on the score values, the intent of the present invention is to assign the limited number of potential offers to the target customers such that the overall value of the group of target customers is maximized (rather than the value to one or just a sub-set of the target customers).

In one embodiment, the bid establishing unit determines that the aggregate value for all target customers is maximized when the bidding results of all target customers is the same between subsequent iterations of the process defined above.

The bid establishing unit 16 is further configured to store data related to the assignment of the offers to the target customers in the memory device 12.

The offer generating unit 18 is coupled memory device and is configured to generate and deliver the offers to the target customers as a function of the data related to the assignment data stored in the memory device 12.

In one embodiment, the offers may delivered to the target customers as at least one of an electronic message, a direct mail communication, and an electronic offer assigned to a customer account. The offer may have an assigned reference number that must be used when the offer is used. If the electronic offer is assigned to the customer account, then the offer may be accessed using a customer loyalty card (or other identification).

Figure 4:
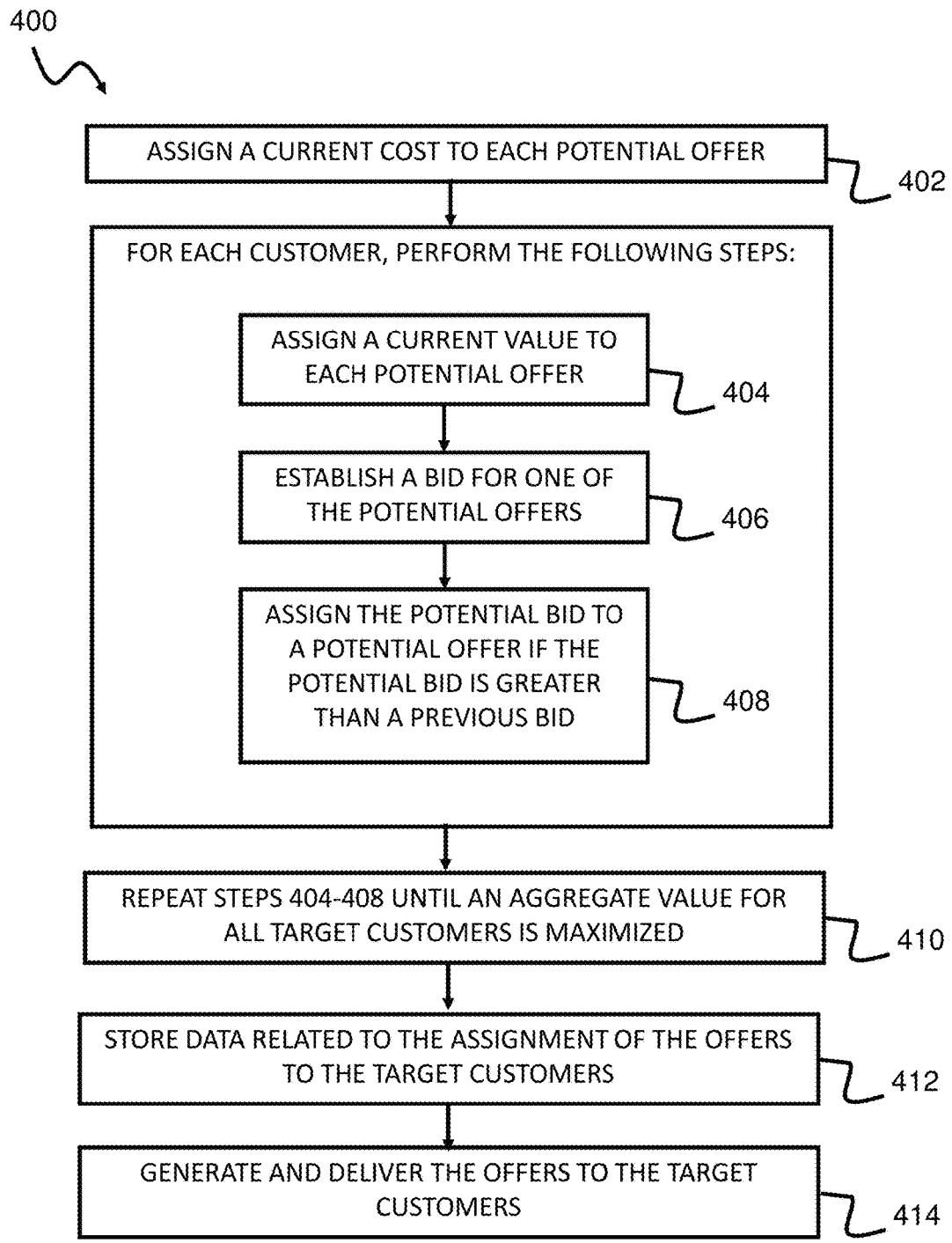

With reference to FIG. 4, a method 400 for assigning and/or delivering offers to target customers is presented. In a first step 402, data associated with a plurality of potential offers, the memory device also being configured to store a score value for each one of the plurality of potential offers for each one of a plurality of target customers is stored in the memory device 12.

Steps 404, 406, 408 are performed for each target customer until a termination condition has been reached. In step 404, a current value for each one of the potential offers to the respective one of the plurality of target customers is assigned as a function of the respective score value and the current cost of the potential offers.

In step 406, a potential bid for one of the potential offers as a function of the current value of each potential offer is established.

In step 408, the potential bid of one of the plurality of target customers is assigned to the one of the potential offers if the potential bid is greater than a previous bid for the one of the potential offers.

Steps 404, 406, 408 are performed iteratively (step 410) until an aggregate value for all target customers is maximized (see above). The bid for one or more of the potential offers by one of the target customers may replace the bid for the one or more of the potential offers made by another one of the target customers. The current cost of the potential offers is updated as the bids are assigned to the offers.

In step 412, the assignment data is stored in the memory device 12.

In step 414, the offers are delivered to the target customers. In one embodiment, the offers may be in the form of at least one of an electronic message, a direct mail communication, and an electronic offer assigned to a customer account.

In one embodiment of the present invention, the memory device 12 includes one or more of the memory devices 104 and/or mass storage devices 108 of one or more of the computing devices 100. The units that comprise the invention are composed of a combination of hardware and software, i.e., the hardware as modified by the applicable software applications. In one embodiment, the units of the present invention are comprised of one of more of the components 102, 104, 106, 108, 110, 112, 130 of one or more of the computing devices (whether computer/network server 202A, 202*b*, 202C, computing asset 210*a*, 20*b*, or terminal 20*ga*, 206*b*, 206*c*), as modified by one or more software applications.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

INDUSTRIAL APPLICABILITY

As discussed above, the present invention provides systems, methods and non-transitory computer-readable storage media for generating offers to a plurality of target customers. A specific implementation of the present invention will be discussed below.

A retail company or grocery store periodically issues offers to their customers for items the customers currently buy (reward offers), the customers used to buy but have not bought in a period of time (remind offers), and items the customers do not buy but the company or store believes the customers might enjoy (recommendation offers). At a particular time during the year, e.g., Thanksgiving, the retail company or grocery store could run a large campaign to assign various offers to their customers. Typically, these campaigns will reach the whole customer base. The size of the assignment problem will hence be large. Each kind of offer is limited in terms of its available copies. For example, the company can only provide at most 10,000 offers of kind A. An upper bound is also imposed on the maximum number of offers a customer can get. This number varies at a small scale based on the customer's purchase history. To avoid redundancy and increase diversity, each customer gets at most one offer from the same category.

The assignment goals may vary according to different objectives. In a reward campaign, the offers for a particular category of items will more likely be issued to the customers who spent a large amount of money in that category. In a recommendation campaign, this score is defined in another way, i.e., estimating how likely a customer would use this offer. However, the model of the assignment problem is similar, i.e., the company would always need to solve a constrained assignment problem to maximize the total score among the customers.

Mathematically, the problem can be formulated as the following:

$$\max \sum_i \sum_j s_{ij} x_{ij} \quad (1)$$

$$\text{s.t.} \sum_j x_{ij} \leq o_i, \forall i \quad (2)$$

$$\sum_i x_{ij} \leq c_j, \forall j \quad (3)$$

$$x_{ij} \in \{0, 1\}, \forall i, j \quad (4)$$

Where $s_{ij}$ is the score between offer i and customer j, $x_{ij}$ is the binary variable indicating if offer i is assigned to customer j ($x_{ij}=1$) or not ($x_{ij}=0$), $o_i$ is the maximum number of available copies for offer i, and $c_j$ is the upper bound for the maximum number of offers customer j can obtain.

This is an integer programming problem. Generally, integer programming is hard, let alone the size of the problem (almost 0.6 gigavariables in this case!).

To deal with this challenge, the present invention utilizes an efficient iterative process. The basic process is described as an auction game. Customers take turns to bid on their favorite offers according to the corresponding scores (values). The offers then have prices from the bids they received. As the auction proceeds, the customers adjust their favorite offers according to the current offer values. The basic algorithm is shown below. The iterative process disclosed herein is scalable. Given the same hardware/memory, the present invention can solve larger problems (more customers+more offers) than prior art methods. Furthermore, the present invention can find the optimum solution more efficiently, i.e., in less time.

This is an iterative algorithm. In each iteration, the system 10, on behalf of a customer computes her current best offers. The current value of an offer to a customer is defined as the difference of that customer's score to the offer and the price of the offer. Then the orders the offers based on the scores (or score values) and starts bidding through starting with the best one (based on the highest score). To calculate the proposed bid, the loss of missing this offer. In that case, the customer can potentially get the $(C[j]+1)^{th}$ best one, i.e., (the backup). The customer is thus willing to give a bid, which is the difference of the best offer and the backup offer. This is also the maximum bid she can give for that offer. Otherwise, the customer would prefer to receive the backup offer (considering the pure profit). When an offer receives that bid, the bid will be added to its maintenance heap, O[i], (the customer and the bid). If all the copies of this offer were assigned, the customer with the lowest bid will be removed. The price of this offer becomes the lowest bid it has received so far. The price will thus remain 0, if all copies have not been assigned. In this embodiment, a minimum bid is enforced. This prohibits customers from bidding 0 all the time and the algorithm looping continuously.

It should be noted that process is performed by the system 10 and is a way to optimally generate and deliver offers to customers, where the offers are limited in number (or copies). The customers take turns bidding on offers. The bidding is process is performed by the system 10 in a way to maximize the aggregate value of the assigned offers to the customers.

At the beginning of one customer's turn, her basket may not be empty, but she does not need to remove these offers since they are still the best. To see this, note the prices of other offers will not decrease since the last iteration and the prices of the offers in her basket will not be greater than her bid. Thus the current values of her occupied offers will still be among the top C[j]. For determining the convergence of the algorithm, one compares the bidding results of all the customers at this iteration and those at the previous one. If they all match, the algorithm terminates.

The process described above is described and proven *Auction/Belief Propagation Algorithm for Constrained Assignment Problem*, Feb. 8, 2015, which is hereby incorporated by reference.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:
1. A system, comprising:
one or more processors; and
memory storing one or more programs to be executed by the one or more processors, the one or more programs comprising instructions for:
populating one or more virtual baskets with a preset list of goods as a function of time associated with a plurality of potential offers for the preset list of goods, wherein a plurality of target customers submits bids on the plurality of potential offers via a plurality of user devices of the plurality of target customers;
determining score values to identify the plurality of target customers associated with the plurality of potential offers based on (a) a history of transactions of a target customer of the plurality of target customers with a retailer and (b) a history of previous offers redeemed by the target customer of the plurality of target customers with the retailer, wherein the previous offers comprise a discount, a rebate, or an indication of a price drop, and wherein the plurality of target customers comprise the target customer;

generating a predetermined number of potential offers from the plurality of potential offers based on at least the score values associated with the plurality of potential offers for the plurality of target customers, wherein the predetermined number of potential offers are valid for a predetermined period of time;

assigning each target customer of the plurality of target customers a respective specific number of the predetermined number of potential offers of the plurality of potential offers, wherein the each target customer receives a different maximum number of potential offers of the plurality of potential offers based on a respective one of the score values assigned to the each target customer;

assigning a current cost to each one of the predetermined number of potential offers from the plurality of potential offers;

performing an iterative process configured to permit the each target customer of the plurality of target customers to take turns to submit a respective bid for a particular potential offer of the predetermined number of potential offers, by:

establishing a current value for the particular potential offer as a function of a score value of the score values associated with the particular potential offer, the current cost of the particular potential offer, and a loss to the target customer submitting the respective bid for the particular potential offer, wherein the loss to the target customer is a subsequent score value assigned to a subsequent potential offer to the target customer;

after the current value of the particular potential offer has been established, establishing a potential bid for the particular potential offer as a function of the current value of the particular potential offer plus the current cost of the particular potential offer; and assigning the potential bid for the particular potential offer to the plurality of target customers to permit the each target customer of the plurality of target customers to virtually bid on the particular potential offer, wherein a highest bid from one of the plurality of target customers that is greater than the potential bid and greater than a previous bid for the particular potential offer is assigned to the particular potential offer, wherein the iterative process continues until an aggregate value for all of the plurality of target customers is maximized;

after completing the iterative process, assigning a final aggregate value of the particular potential offer to respective target customers of the plurality of target customers;

transmitting, from a bid establishing unit to an offer generating unit that is coupled to the memory, the final aggregate value of the particular potential offer associated with the respective target customers of the plurality of target customers;

generating, via the offer generating unit, the particular potential offer of the plurality of potential offers based on the final aggregate value; and delivering, via at least electronic messages from the offer generating unit, the particular potential offer of the plurality of potential offers to the plurality of user devices that are associated with the respective target customers of the plurality of target customers.

2. The system, as set forth in claim 1, further comprising generating, via the offer generating unit, offers for delivery to the plurality of user devices associated with the respective target customers of the plurality of target customers as a function of data in the memory related to an assignment of the plurality of potential offers to the plurality of target customers.

3. The system, as set forth in claim 2, wherein the plurality of potential offers are delivered to the plurality of user devices of the plurality of target customers as at least one of electronic messages, direct mail communications, or electronic offers assigned to customer accounts.

4. The system, as set forth in claim 1, further comprising: assigning a lowest value of all bids as a current price of the particular potential offer, wherein:
a current price of zero is assigned if the particular potential offer is unassigned.

5. The system, as set forth in claim 1, wherein establishing the current value for the particular potential offer further comprises establishing the current value as a difference between the score value and the current cost of the particular potential offer.

6. The system, as set forth in claim 1, wherein the aggregate value for all of the plurality of target customers is maximized when bidding results of all of the plurality of target customers are the same between two iterations of the iterative process.

7. The system, as set forth in claim 1, wherein each target customer of the plurality of target customers has an associated maximum number of offers of the plurality of potential offers that may be assigned thereto.

8. The system, as set forth in claim 7, wherein each target customer of the plurality of target customers has an associated minimum number of offers of the plurality of potential offers that must be assigned thereto.

9. The system, as set forth in claim 1, wherein:
each one of the plurality of potential offers has an assigned number of copies; and
each potential offer of the plurality of potential offers may be made the respective assigned number of copies.

10. The system, as set forth in claim 1, wherein each potential offer of the plurality of potential offers is assigned at least one category from a plurality of categories, and wherein each of the plurality of target customers can be assigned up to only a predetermined number of potential offers from each category of the plurality of categories.

11. A method, comprising:
populating, with a computer system, one or more virtual baskets with a preset list of goods as a function of time associated with a plurality of potential offers for the preset list of goods, wherein a plurality of target customers submit bids on the plurality of potential offers via a plurality of user devices of the plurality of target customers;

determining, with the computer system using one or more processors, score values to identify the plurality of target customers associated with the plurality of potential offers based on (a) a history of transactions of a target customer of the plurality of target customers with a retailer and (b) a history of previous offers redeemed by the target customer of the plurality of target customers with the retailer, wherein the previous offers comprise a discount, a rebate, or an indication of a price drop, and the plurality of target customers comprise the target customer;

generating, with the computer system, a predetermined number of potential offers from the plurality of potential offers based on at least the score values associated with the plurality of potential offers for the plurality of target customers, wherein the predetermined number of potential offers are valid for a predetermined period of time;

assigning each target customer of the plurality of target customers a respective specific number of the predetermined number of potential offers of the plurality of potential offers, wherein the each target customer receives a different maximum number of potential offers of the plurality of potential offers based on a respective one of the score values assigned to the each target customer;

assigning, with the computer system, a current cost to each one of the predetermined number of potential offers from the plurality of potential offers;

performing, with the computer system, an iterative process configured to permit the each target customer of the plurality of target customers to take turns to submit a respective bid for a particular potential offer of the predetermined number of potential offers, by:
(a) establishing a current value for the particular potential offer as a function of a score value of the score values associated with the particular potential offer, the current cost of the particular potential offer, and a loss to the target customer submitting the respective bid for the particular potential offer, wherein the loss to the target customer is a subsequent score value assigned to a subsequent potential offer to the target customer;
(b) after the current value of the particular potential offer has been established, establishing a potential bid for the particular potential offer as a function of the current value of the particular potential offer plus the current cost of the particular potential offer; and
(c) assigning the potential bid for the particular potential offer to the plurality of target customers to permit the each target customer of the plurality of target customers to virtually bid on the particular potential offer, wherein a highest bid from one of the plurality of target customers that is greater than the potential bid and greater than a previous bid for the particular potential offer is assigned to the particular potential offer, wherein the iterative process continues until an aggregate value for all of the plurality of target customers is maximized;

after completing the iterative process, with the computer system, assigning a final aggregate value of the particular potential offer to respective target customers of the plurality of target customers;

transmitting, from a bid establishing unit to an offer generating unit that is coupled to a memory, the final aggregate value of the particular potential offer associated with the respective target customers of the plurality of target customers;

generating, via the offer generating unit, the particular potential offer of the plurality of potential offers based on the final aggregate value; and delivering, via at least electronic messages from the offer generating unit, the particular potential offer of the plurality of potential offers to the plurality of user devices that are associated with the respective target customers of the plurality of target customers.

12. The method, as set forth in claim 11, further comprising generating, via the offer generating unit, offers for delivery to the plurality of user devices associated with the respective target customers of the plurality of target customers as a function of data in the memory related to an assignment of the plurality of potential offers to the plurality of target customers.

13. The method, as set forth in claim 12, wherein the plurality of potential offers are delivered to the plurality of user devices of the plurality of target customers as at least one of electronic messages, direct mail communications, or electronic offers assigned to customer accounts.

14. The method, as set forth in claim 11, further comprising assign a lowest value of all bids as a current price of the particular potential offer, wherein:
a current price of zero is assigned if the particular potential offer is unassigned.

15. The method, as set forth in claim 11, establish the current value for the particular potential offer further comprises establishing the current value as a difference between the score value and the current cost of the particular potential offer.

16. The method, as set forth in claim 11, wherein the aggregate value for all of the plurality of target customers is maximized when bidding results of all of the plurality of target customers are the same between two iterations of the iterative process.

17. The method, as set forth in claim 11, wherein each target customer of the plurality of target customers has an associated maximum number of offers of the plurality of potential offers that may be assigned thereto.

18. The method, as set forth in claim 17, wherein each target customer of the plurality of target customers has an associated minimum number of offers of the plurality of potential offers that must be assigned thereto.

19. The method, as set forth in claim 11, wherein each one of the plurality of potential offers has an assigned number of copies and each potential offer of the plurality of potential offers may be made the respective assigned number of copies.

20. The method, as set forth in claim 11, wherein each potential offer of the plurality of potential offers is assigned at least one category from a plurality of categories, wherein each of the plurality of target customers can be assigned up to only a predetermined number of potential offers from each category of the plurality of categories.

21. One or more non-transitory computer-readable storage media, having computer-executable instructions embodied thereon, wherein when executed by at least one processor, the computer-executable instructions cause the processor to operate as:
populating one or more virtual baskets with a preset list of goods as a function of time associated with a plurality of potential offers for the preset list of goods, wherein a plurality of target customers submit bids on the plurality of potential offers via a plurality of user devices of the plurality of target customers;
determine score values to identify the plurality of target customers associated with the plurality of potential offers based on (a) a history of transactions of a target customer of the plurality of target customers with a retailer and (b) a history of previous offers redeemed by the target customer of the plurality of target customers with the retailer, wherein the previous offers comprise a discount, a rebate, or an indication of a price drop, and wherein the plurality of target customers comprise the target customer;

generate a predetermined number of potential offers from the plurality of potential offers based on at least the score values associated with the plurality of potential offers for the plurality of target customers, wherein the predetermined number of potential offers are valid for a predetermined period of time;

assign each target customer of the plurality of target customers a respective specific number of the predetermined number of potential offers of the plurality of potential offers, wherein the each target customer receives a different maximum number of potential offers of the plurality of potential offers based on a respective one of the score values assigned to the each target customer;

assign a current cost to each one of the predetermined number of potential offers from the plurality of potential offers;

perform an iterative process configured to permit the each target customer of the plurality of target customers to take turns to submit a respective bid for a particular potential offer of the predetermined number of potential offers, by:
- (a) establishing a current value for the particular potential offer as a function of a score value of the score values associated with the particular potential offer, the current cost of the particular potential offer, and a loss to the target customer submitting the respective bid for the particular potential offer, wherein the loss to the target customer is a subsequent score value assigned to a subsequent potential offer to the target customer;
- (b) after the current value of the particular potential offer has been established, establishing a potential bid for the particular potential offer as a function of the current value of the particular potential offer plus the current cost of the particular potential offer; and
- (c) assigning the potential bid for the particular potential offer to the plurality of target customers to permit the each target customer of the plurality of target customers to virtually bid on the particular potential offer, wherein a highest bid from one of the plurality of target customers that is greater than the potential bid and greater than a previous bid for the particular potential offer is assigned to the particular potential offer, wherein the iterative process continues until an aggregate value for all of the plurality of target customers is maximized;

after completing the iterative process, assigning a final aggregate value of the particular potential offer to respective target customers of the plurality of target customers;

transmitting, from a bid establishing unit to an offer generating unit that is coupled to a memory, the final aggregate value of the particular potential offer associated with the respective target customers of the plurality of target customers;

generating, via the offer generating unit, the particular potential offer of the plurality of potential offers based on the final aggregate value; and delivering, via at least electronic messages from the offer generating unit, the particular potential offer of the plurality of potential offers to the plurality of user devices that are associated with the respective target customers of the plurality of target customers.

* * * * *